(12) United States Patent  
Twardowski

(10) Patent No.: US 8,886,461 B2  
(45) Date of Patent: Nov. 11, 2014

(54) METHOD FOR VALIDATING INLAND BARRIER CROSSING IN A DIGITAL MAP

(75) Inventor: Łukasz Twardowski, Łódź (PL)

(73) Assignee: TomTom Polska Sp. z.o.o., Warsaw (PL)

( * ) Notice: Subject to any disclaimer, the term of this patent is extended or adjusted under 35 U.S.C. 154(b) by 66 days.

(21) Appl. No.: 13/806,241

(22) PCT Filed: Jun. 22, 2010

(86) PCT No.: PCT/EP2010/058836  
§ 371 (c)(1),  
(2), (4) Date: Mar. 11, 2013

(87) PCT Pub. No.: WO2011/160681  
PCT Pub. Date: Dec. 29, 2011

(65) Prior Publication Data  
US 2013/0218466 A1 Aug. 22, 2013

(51) Int. Cl.  
*G01C 21/32* (2006.01)

(52) U.S. Cl.  
CPC ..................................... *G01C 21/32* (2013.01)  
USPC .......................................................... 701/533

(58) Field of Classification Search  
None  
See application file for complete search history.

(56) References Cited

U.S. PATENT DOCUMENTS

| 2004/0030670 A1* | 2/2004 | Barton | 707/1 |
| 2009/0216442 A1* | 8/2009 | Luert | 701/211 |
| 2013/0085659 A1* | 4/2013 | Bekaert | 701/118 |

FOREIGN PATENT DOCUMENTS

WO 2008110321 A1 9/2008

OTHER PUBLICATIONS

International Search Report issued Mar. 24, 2011 for International Application No. PCT/EP2010/058836.

* cited by examiner

*Primary Examiner* — John R Olszewski  
*Assistant Examiner* — David Merlino

(57) ABSTRACT

A method for detecting inland barrier (16, 16') crossings (24, 26, 30) using speed layers from community input probe traces in combination with a digital map. Inland barrier crossing specifications are detected and/or validated using information about the speed of probes that actually cross the barrier (16, 16'). A bridge (26) across the inland barrier (16) is inferred if the velocity average for barrier crossing probe traces is greater than an established threshold value. Conversely, a ferry (24) is inferred if the average velocity for barrier crossing probe traces is less than the established threshold value. When there is a prominent gap in the data for the barrier crossing probe traces, a tunnel (30) is inferred.

15 Claims, 12 Drawing Sheets

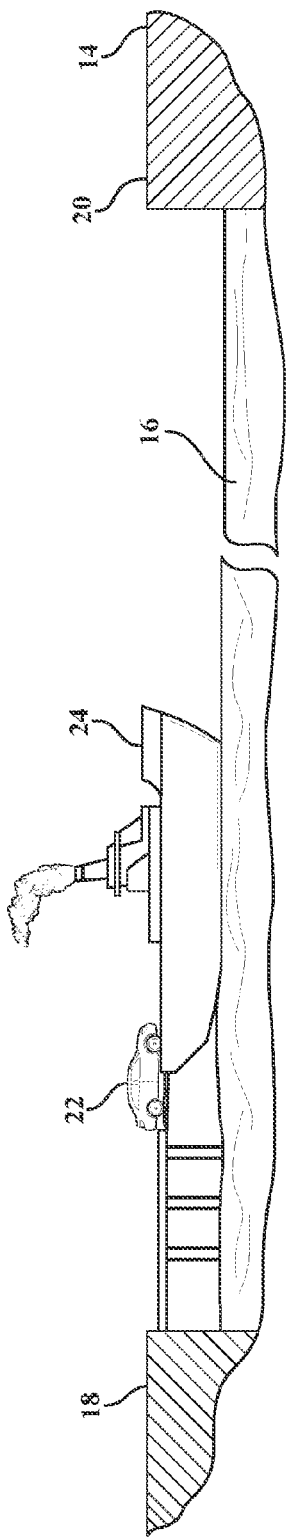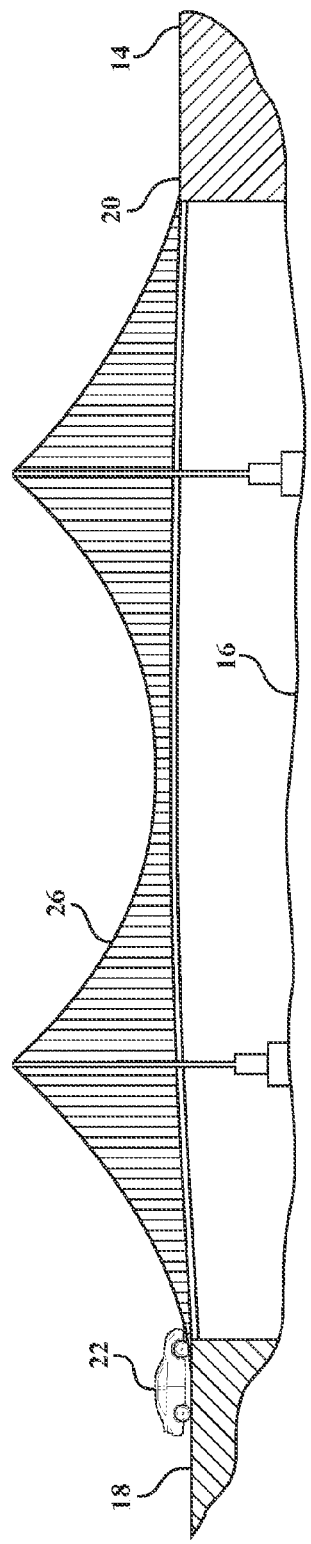

METHOD FOR VALIDATING INLAND BARRIER CROSSING IN A DIGITAL MAP

CROSS-REFERENCES TO RELATED APPLICATIONS

This application is the National Stage of International Application No. PCT/EP2010/058836, filed Jun. 22, 2010 and designating the United States. The entire content of this application is incorporated herein by reference.

BACKGROUND OF THE INVENTION

1. Field of the Invention

This invention relates to digital maps of the type for displaying road or pathway information, and more particularly toward a method for verifying and updating information contained in a digital map using probe data.

2. Related Art

Personal navigation devices like that shown for example in FIG. 1 utilize digital maps combined with accurate positioning data from GPS or other data streams. These devices have been developed for many applications, such as navigation assistance for automobile drivers. The effectiveness of these navigation systems is inherently dependent upon the accuracy of the information provided to it in the form of digital maps, stored in its memory or otherwise accessed through a suitable database connection such as wireless signal, cable, telephone line, etc.

Typically, the navigation system 10 (FIG. 1) includes a display screen 12 that portrays a portion of a stored digital map as a network of roads 14. A traveler having access to a GPS-enabled navigation device 10 may then be generally located on the digital map close to or with regard to a particular road 14 or segment thereof. Some GPS-enabled navigation devices 10, like several models manufactured by Tom-Tom NV (www.tomtom.com), may also be configured as probes to passively generate probe measurement points at regular intervals. Such probe traces comprise a sequence of discrete geo-coded positions recorded at intervals of, for example, five seconds. Of course, other suitable devices may be used to generate probe measurement points including, for example, handheld devices, mobile phones, PDAs, and the like. Thus, probe data may be described as a set of information about movement of a vehicle (or a person carrying a probe) which contains time-stamped geographic locations (xyz coordinates) and possibly also metadata (vehicle speed, receiver type, vehicle type, etc.).

It is known to take collections of probe measurements for the purpose of incrementally creating and/or updating digital maps. The probe measurements can be transmitted either on-the-fly or subsequently to a collection service or other map data analysis service via wireless (e.g., cellular) transmission, via internet uploads, or by other convenient methods. Internet uploads may be synchronized to occur in conjunction with digital map upgrades which navigation device users might obtain as part of a service. From the collection of probe measurements, road geometries can be inferred and other features and attributes derived by appropriate analytical methods.

A typical collection of probe measurements collected from a plurality of probes traversing a particular section of a digital map over a period of time may contain billions of discrete data points, each geo-coded and time stamped. Probe traces collected over time can be grouped according to those which match to a common area of the digital map and then overlaid for interpretation by map database editors. These editors use various mathematic and statistical techniques to determine or infer road geometries, compute speed profiles, acceleration profiles, direction of travel, altitude, detect changes in road networks, to compare two road networks, and many other specifications.

As suggested previously, the effectiveness of a personal navigation device 10 depends upon the accuracy of the information contained in the digital map. Digital map providers continuously strive to improve and update their maps. Inaccurate data, for example, may be unsuitable to compute optimal routes in response to a navigation query, or to provide other reliable information to a traveler. Inaccurate or incomplete information contained in a digital map can result in poor or erroneous navigation instructions and lead to undesirable navigation decisions.

Navigation decisions almost always take into account natural features of the landscape, which often present barriers to travel. For example, an inland water barrier, such as a river, canal, drainage, marsh, lake or bay, represents a constraint to vehicular travel, as well as to pedestrian and bicycle travel. Typically, an inland water barrier may be crossed only with the aid of a ferry, bridge or tunnel. In mountainous terrain, tunnels are sometimes cut through a mountain and bridges are sometimes placed across deep valleys and gorges. The existence or nonexistence of a bridge, ferry or tunnel constitutes an important detail to be recorded in a digital map. Likewise, the average speed over which historically measured vehicular traffic crosses a barrier is also an important detail for inclusion in digital maps.

Until now, there is no effective method by which to analyze probe measurements to determine whether a particular inland barrier crossing comprises a bridge or a ferry or a tunnel. Therefore, there is a need in the art for an improved method for efficiently analyzing probe measurements for the benefit of database editors to validate and/or determine the specification for an inland barrier crossing, i.e., either a bridge or a ferry, or perhaps a tunnel.

SUMMARY OF THE INVENTION

This invention relates to methods and techniques for validating an inland water barrier crossing specification in a digital map by observing local probe data. The method enables collected probe data to be efficiently evaluated in regard to the existence and type of inland water barrier crossing that may exist in reality. The method of this invention includes a digital map having at least two road segments separated from one another by an inland water barrier, such as a river, canal, drainage, marsh, lake or bay, etc. Data is reported from a plurality of probe traces traveling the two road segments in the vicinity of the inland water barrier. The reported data includes velocity information or enables the derivation of velocity information. Probe traces that traverse the inland water barrier crossing from one road segment to the other road segment are analyzed to determine an average crossing speed or velocity. A crossing speed threshold value is established. A bridge linking the two road segments across the inland water barrier is inferred if the computed velocity average for the barrier crossing probe traces is greater than the crossing speed threshold value. Conversely, a ferry is inferred across the inland water barrier if the velocity average is less than the crossing speed threshold value.

Principles of this invention can be used to effectively locate ferry crossings and bridge crossings where none currently exist within a digital map. Likewise, digital map errors can be identified, namely if a bridge is shown in the digital map but in reality a ferry exists, or vice versa. Accordingly, this invention enables a new use for information obtained from community input or other probe measurement collection techniques.

According to another aspect of this invention, the techniques can be used to determine crossing specifications for all types of inland barriers including tunnels as well as the previously mentioned bridges and ferries. According to this aspect of the invention, a digital map is provided having at least two road segments separated from one another by any kind of inland barrier, such as a river, lake, mountain or valley, etc. Data is reported from a plurality of probe traces traveling the two road segments in the vicinity of the inland barrier. The reported data includes velocity information or enables the derivation of velocity information. Probes that traverse the inland barrier crossing from one road segment to the other road segment are analyzed to derive the average speed across which the probe traces transit the inland water barrier. A crossing speed threshold value is established. A bridge linking the two road segments across the inland barrier is inferred if the computed velocity average for the barrier crossing probe traces is greater than the crossing speed threshold value. A ferry is inferred across the inland barrier if the velocity average is less than the crossing speed threshold value. A tunnel linking the two road segments across the inland barrier is inferred if the velocity average for the grouped probe traces is generally nonexistent.

BRIEF DESCRIPTION OF THE DRAWINGS

These and other features and advantages of the present invention will become more readily appreciated when considered in connection with the following detailed description and appended drawings, wherein:

FIG. 2 is a highly simplified elevation view of an inland water barrier, e.g., a bay or lake, in which a ferry service links road segments on either side of the water barrier;

FIG. 3 is a simplified view as in FIG. 2 however showing a bridge feature linking road segments on either side of an inland water barrier (e.g., river);

DETAILED DESCRIPTION OF THE PREFERRED EMBODIMENT

Figure 1:
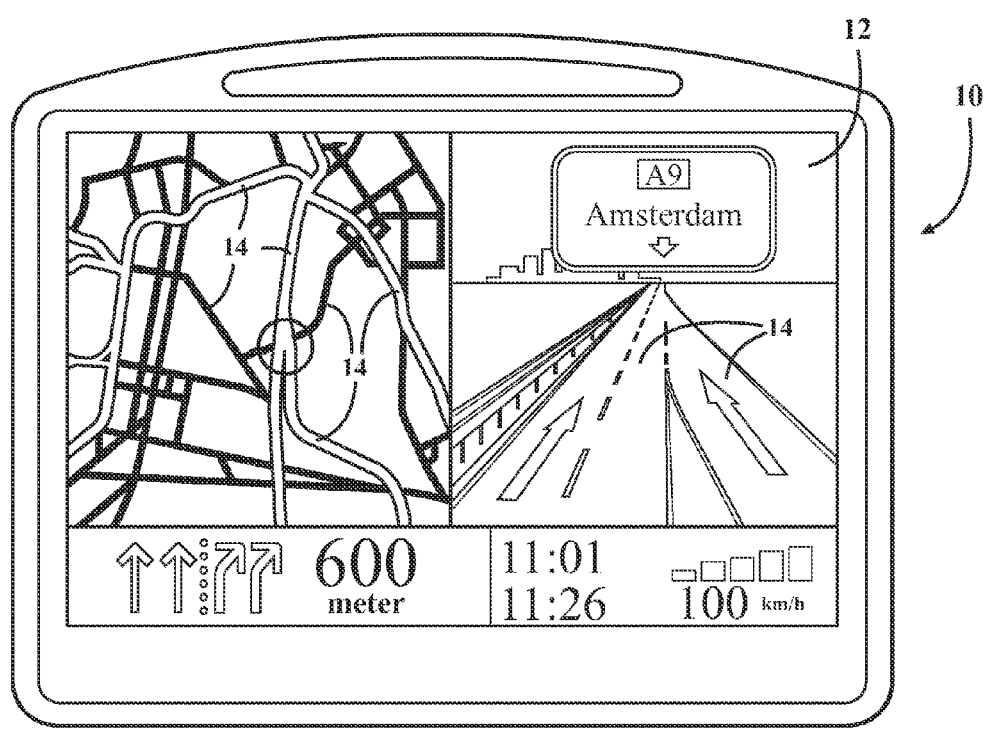
FIG. 1 is an exemplary view of a portable navigation device according to one embodiment of this invention including a display screen for presenting map data information.

Referring to the figures, wherein like numerals indicate like or corresponding parts throughout the several views, this invention pertains to digital maps as used by navigation systems, as well as other map applications which may include those viewable through internet enabled computers, PDAs, cellular phones, and the like.

FIG. 2 depicts, in highly simplified form, an inland water barrier in the form of a lake or bay 16. Of course, there are many types of inland water barriers including also rivers, canals, drainage channels, marshes, etc. Furthermore, included within the intended definition of inland water barriers 16 as used in this document are sufficiently narrow passages through any body of water which can be spanned with a bridge or ferry, as well as transit to offshore islands and the like which can be linked by a bridge or ferry. Non-water type inland barriers can include mountains 16' (FIGS. 19-21), valleys, and the like.

In the FIG. 2 example, road segments 18, 20 comprise those portions of an overall road network 14 contained in a digital map, but specifically located on adjoining sides of an inland water barrier 16. Typically, the road segments 18, 20 will be of the type capable of supporting vehicular traffic flow, although the principles of this invention are equally applicable to bicycle and pedestrian paths as well. An automobile 22 is shown entering a ferry 24 for passage across the inland water barrier 16 to the awaiting road segment 20.

FIG. 3 is similar in many respects to FIG. 2, however the inland water barrier 16 in this example comprises a river and a bridge 26 is provided to join or link the opposing road segments 18, 20. Accordingly, vehicles 22 are able to cross from one road segment 18 to the other road segment 20 by traversing the inland water barrier 16 via the bridge 26.

Figure 4:
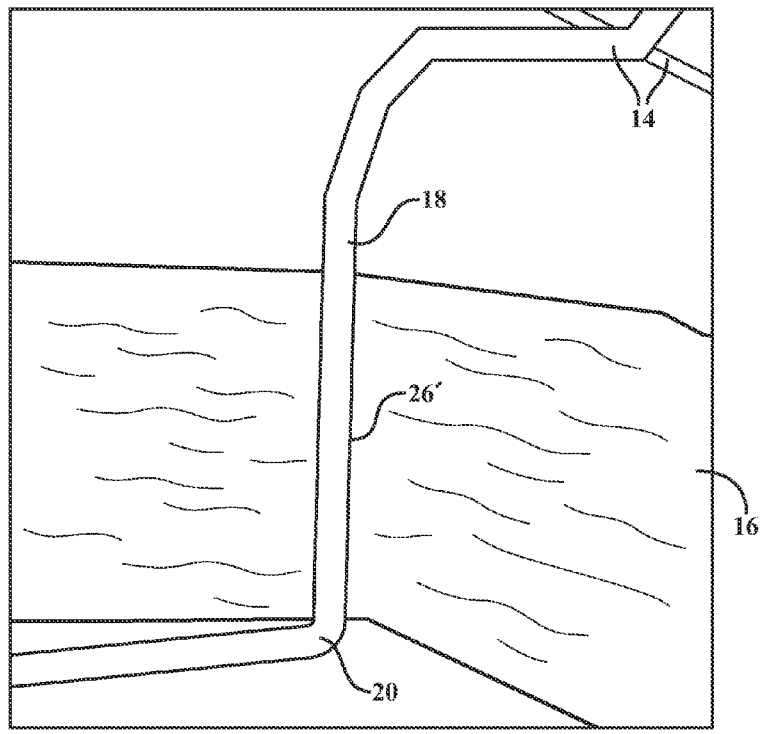
FIG. 4 is a view of a prior art digital map depicting a bridge element crossing an inland water barrier (river)
Figure 5:
FIG. 5 is a satellite photograph providing Ground Truth for the section of land depicted in the digital map of FIG. 4, and wherein a ferry service is evident at the crossing point rather than a bridge.

FIG. 4 portrays a section of a digital map containing several road segments 14. An inland water barrier 16 in the form of a river passes in a generally East-West direction. Road segments 18, 20 are provided in the vicinity of the inland water barrier 16, and are shown here (erroneously) connected or linked together by a bridge 26'. FIG. 5 is a satellite image of the corresponding section of earth in reality. This satellite image represents Ground Truth for this section of earth. The satellite image reveals that in truth a ferry links the road segments 18, 20. In situations like this, the erroneous depiction of bridge 26' in the digital map may go unnoticed or uncorrected by digital map database editors for a long period of time. Erroneous map data can lead to inaccurate navigation assistance and/or undesirable navigation decisions.

Figure 6:
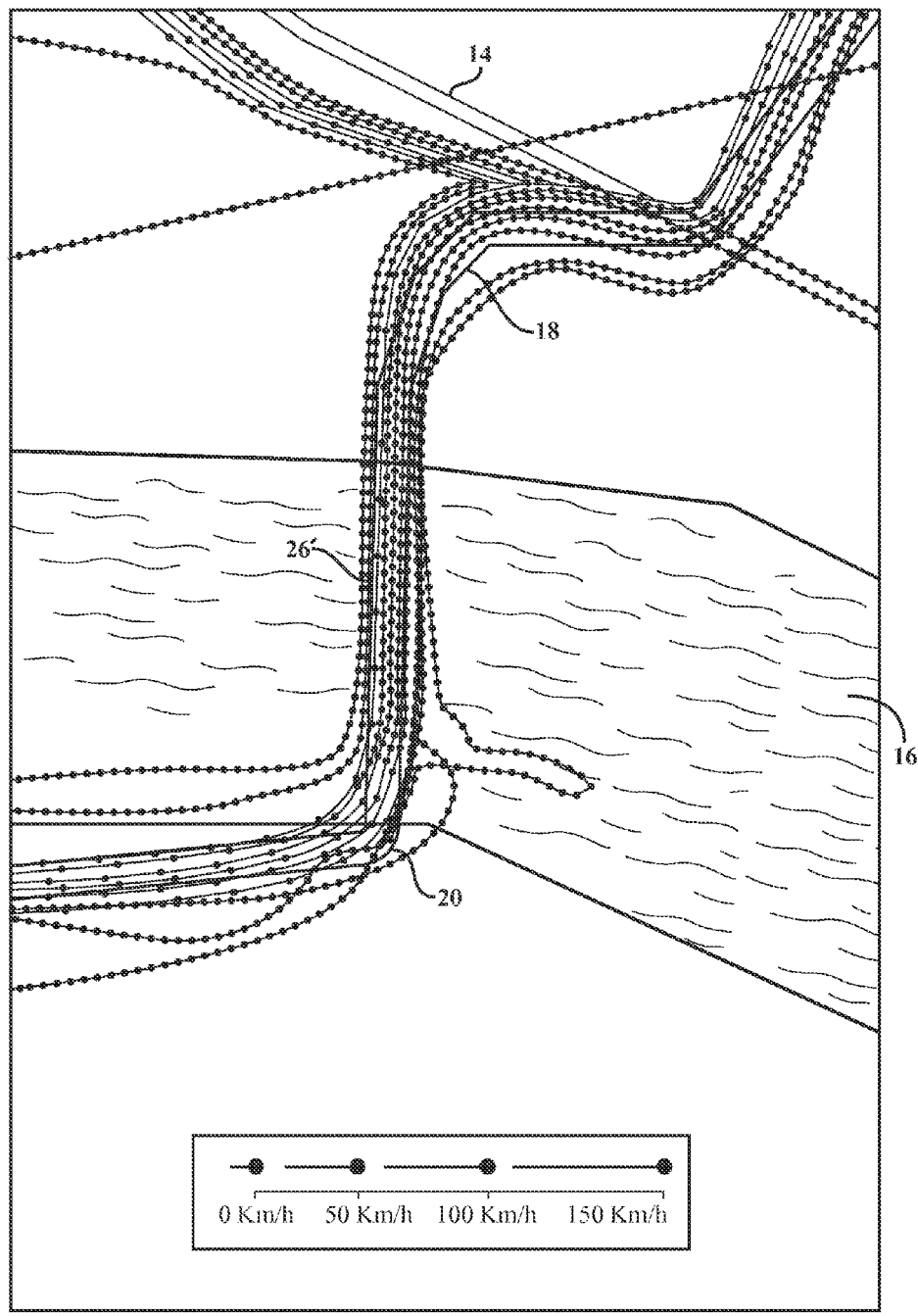
FIG. 6 is a view of the digital map in FIG. 4 overlaid with velocity information from collected probe data describing the speeds at which probe traces cross the inland water barrier from which a ferry crossing can be inferred.

FIG. 6 is a view of the same section of digital map as presented in FIG. 4, but with overlay probe traces as collected from vehicles with appropriately enabled probe devices. A plurality of probe traces can be observed from the reported data traveling the road segments 18, 20 in the vicinity of the inland water barrier 16. This reported data may either include direct velocity information, perhaps as metadata, or enable the derivation of velocity information by the time-stamped position measurements embodied in each probe trace. From this velocity information, it is possible to compute an average velocity for all probe traces crossing the barrier 16. In this particular example, the average speed of probe traces crossing the barrier is determined to be slightly greater than 0 km/h. The legend provided in FIG. 6 and correlating the depicted probe traces to velocity information serves as a reference also for the probe traces shown in FIGS. 9, 12, 14, 16, and 20.

Figure 7:
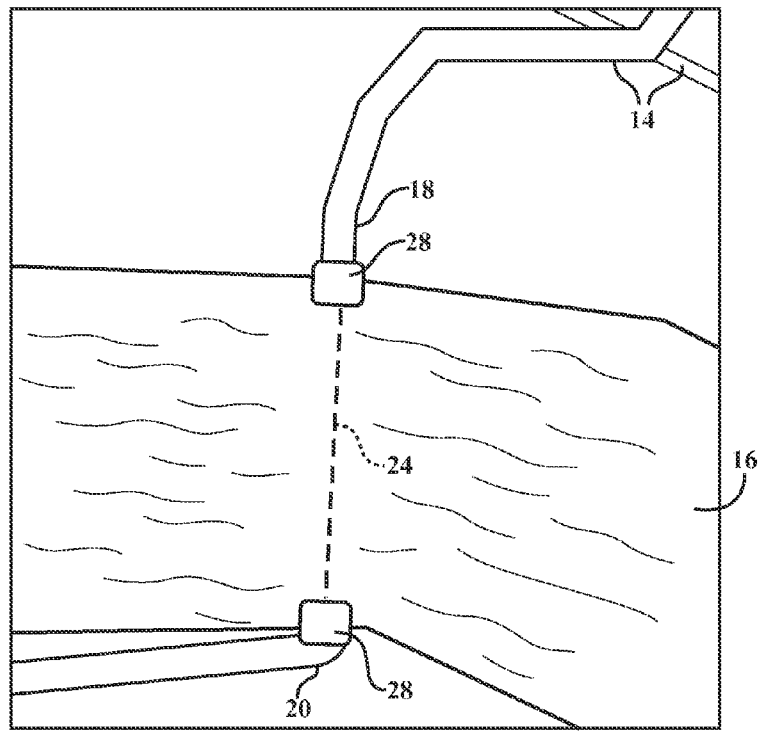
FIG. 7 is an updated view of the digital map of FIG. 4 showing a ferry crossing designation joining road segments on either side of the inland water barrier.

By establishing a crossing speed threshold value, it is possible to infer from probe data alone whether a bridge 26 or ferry 24 links the two road segments 18, 20. The threshold value may be established on a case-by-case basis, or categorically, or by other rules of application. In this example, a crossing speed threshold value of 10 km/h, or more preferably 5 km/h, or more preferably still 1 km/h, may be established. The velocity average for the probe traces crossing the barrier 16 are compared to the established threshold value. If the velocity average for the barrier crossing probe traces is greater than the crossing speed threshold value, a bridge can be inferred linking the two road segments 18, 20. However, if the velocity average for the barrier crossing probe traces is less than the crossing speed threshold value, a ferry can be inferred linking the two road segments 18, 20 across the inland water barrier 16. In this example, the average velocity for the barrier crossing probe traces is less than the (exemplary) established crossing speed threshold value, and therefore a ferry 24 is inferred. This inference corresponds to the Ground Truth data provided by the satellite image in FIG. 5. Thus, the digital map used by the navigation device 10 is altered on the basis of the described inferring step so as to designate a ferry 24 interconnecting the two road segments 18, 20, like that shown in FIG. 7.

Figure 8:
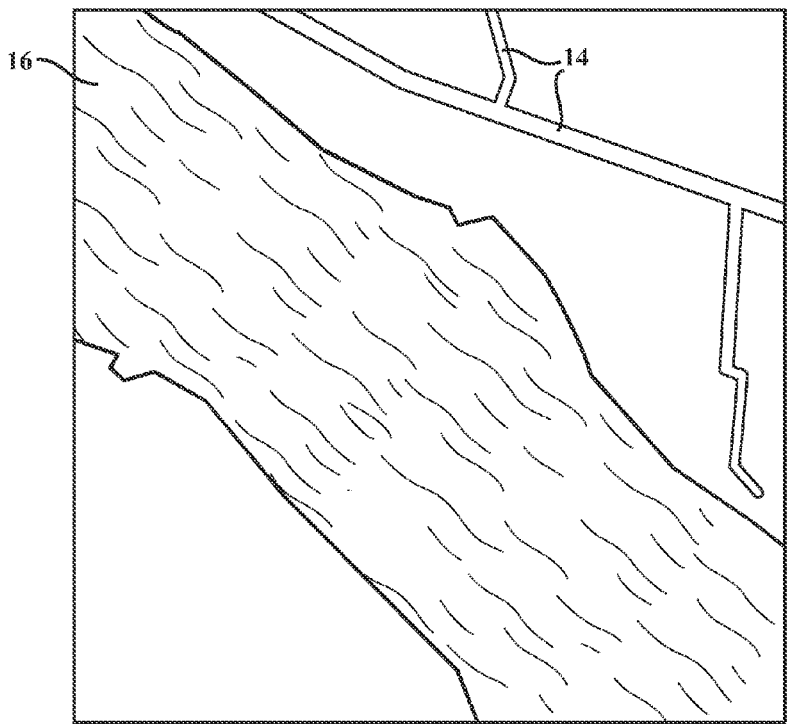
FIG. 8 is another example of a prior art digital map including an inland water barrier in the form of a river.
Figure 9:
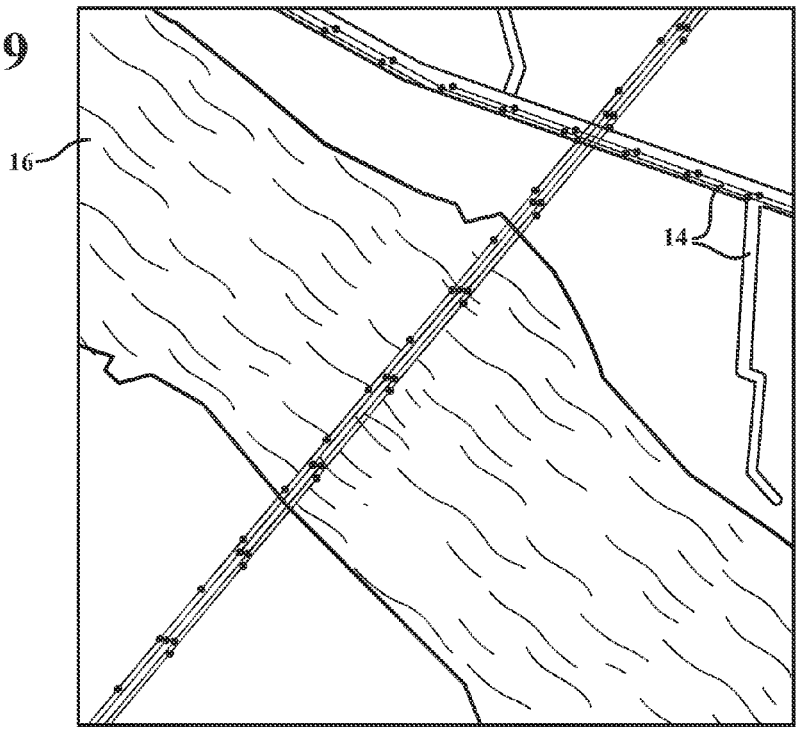
FIG. 9 is a view as in FIG. 8 superimposed with velocity information from collected probe data from which can be inferred a bridge crossing over the inland water barrier.
Figure 10:
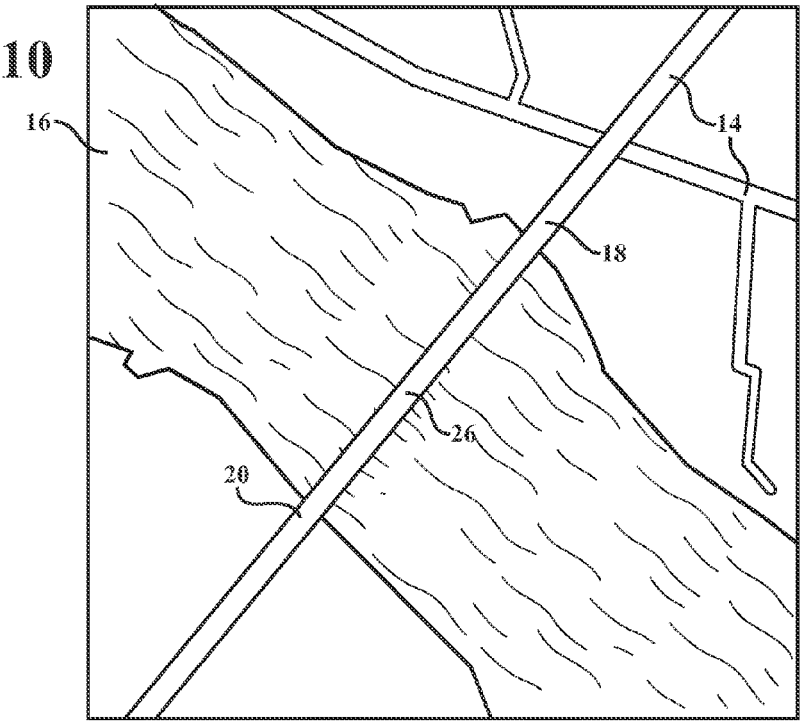
FIG. 10 is an updated view of the digital map depicting a bridge element corresponding to the velocity information obtained by probe measurements.

In another example, FIG. 8 presents a digital map region showing an inland water barrier 16 without any crossing specification whatsoever. As a result, navigation decisions based on the absence of any crossing specification in this region may be flawed. FIG. 9 represents the same section of digital map superimposed with probe trace data. The probe trace data contains, or is analyzed to provide, velocity information for the probe traces that cross the inland water barrier 16. In this example, the velocity average for the barrier crossing probe traces is in excess of 50 km/h, and therefore greater than the exemplary crossing speed threshold value of 10 km/h (or more preferably 5 km/h, or more preferably still 1 km/h). As a consequence, map editors may infer that a bridge crosses the inland water barrier 16. Using this inferred information, the digital map is revised as shown in FIG. 10 to visually represent a vehicular bridge 26 across the inland water barrier 16. Further navigation decisions will be more reliable as a result of the updated river crossing specification.

Figure 11:
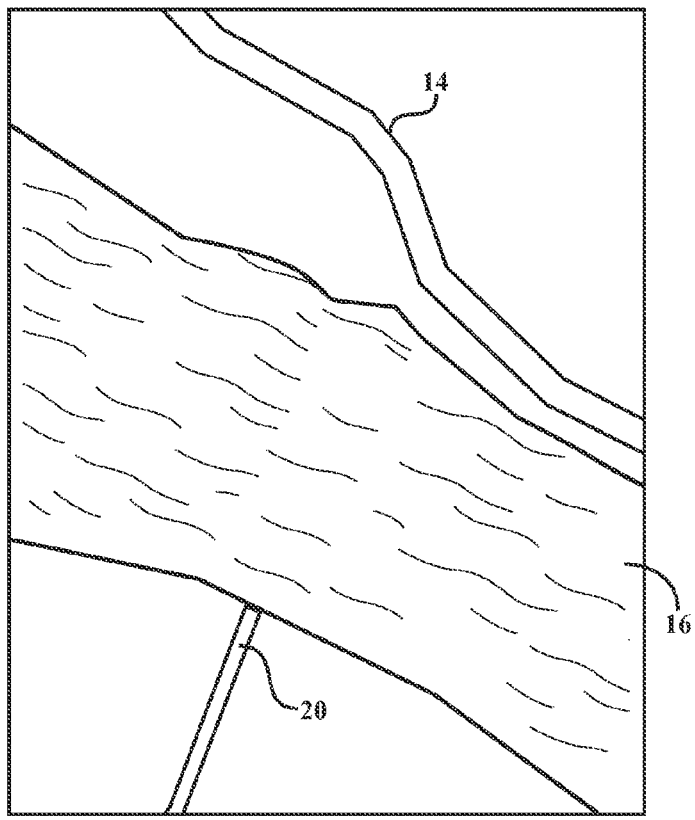
FIG. 11 is yet another view of a prior art section of digital map containing an inland water barrier in the form of a river and which describes no crossing method with which to transit the river.
Figure 12:
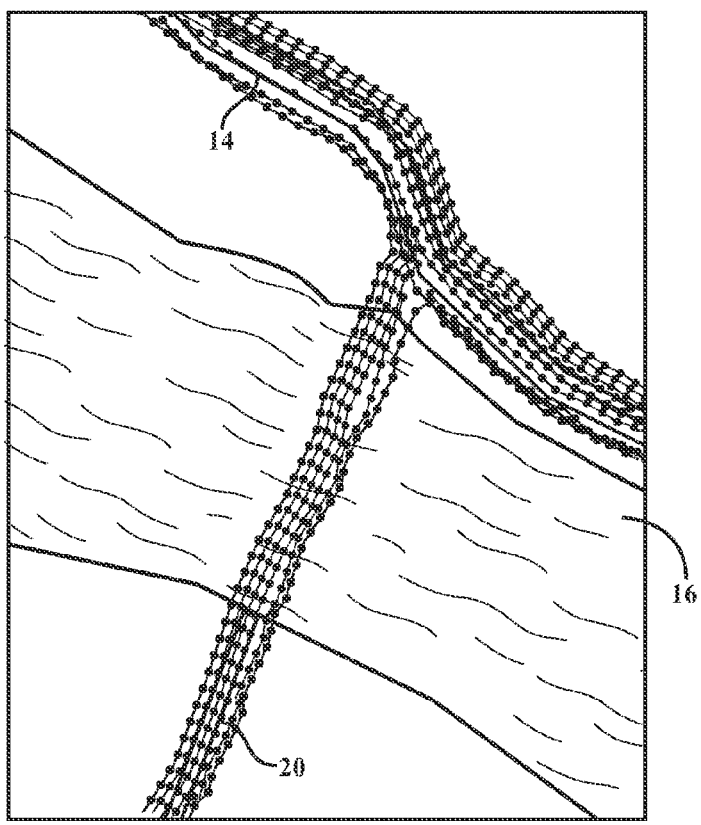
FIG. 12 is a view as in FIG. 11 showing superimposed thereon probe trace information from which a velocity average can be computed so as to infer a ferry crossing.
Figure 13:
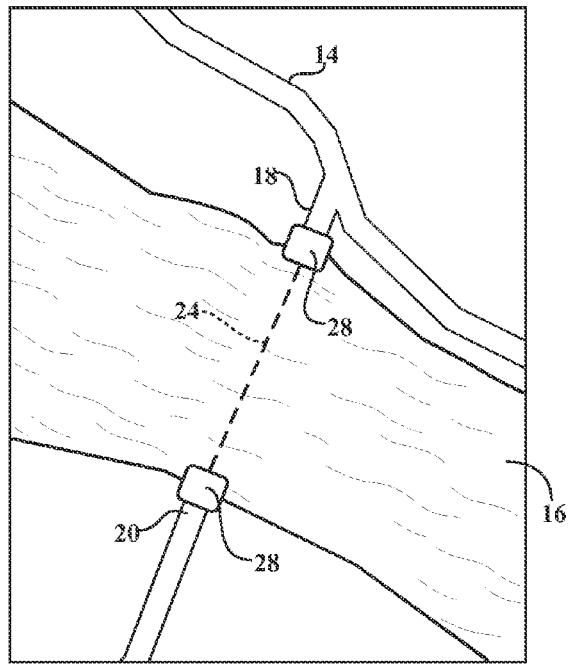
FIG. 13 is a view as in FIG. 11 showing an updated digital map designating a ferry linking two road segments across the inland water barrier.

A still further example is provided by way of reference to FIG. 11, which depicts a small section of a digital map including an inland water barrier 16. In this example, the map erroneously describes no method by which a crossing of the inland water barrier 16 can be made in this particular region. However, by superimposing probe trace data over the digital map as shown in FIG. 12, it can be seen that a plurality of probe traces do in fact cross the barrier 16 from one road segment 18 to the other 20. By comparing the average velocity for these barrier crossing probe traces to the established threshold value, it can be inferred from this example that a ferry 24 links the opposing road segments 18, 20 across the inland water barrier 16. Thus, as shown in FIG. 13, the digital map can be updated, or altered, to designate in this case a ferry 24 interconnecting the two road segments 18, 20.

The barrier crossing probe trace data can be grouped and analyzed further still to glean additional useful information relating to the barrier crossings. For example, when the probe data indicates the presence of a ferry crossing, the ferry entrance and exit locations 28 can be placed with specificity in the digital map thereby making the digital map more accurate and more useful. Furthermore, the average crossing time of the inland water barrier 16 can be calculated and added as an attribute in the digital map. This average crossing time attribute can be used in a navigation cost analysis and for other useful analytical purposes. Furthermore, the probe traces crossing the inland water barrier can be grouped into time slices by time of day, day of week, holiday, etc. As a result, the digital map can be attributed with highly detailed information to provide even more useful data for navigation and routing purposes.

Figure 14:
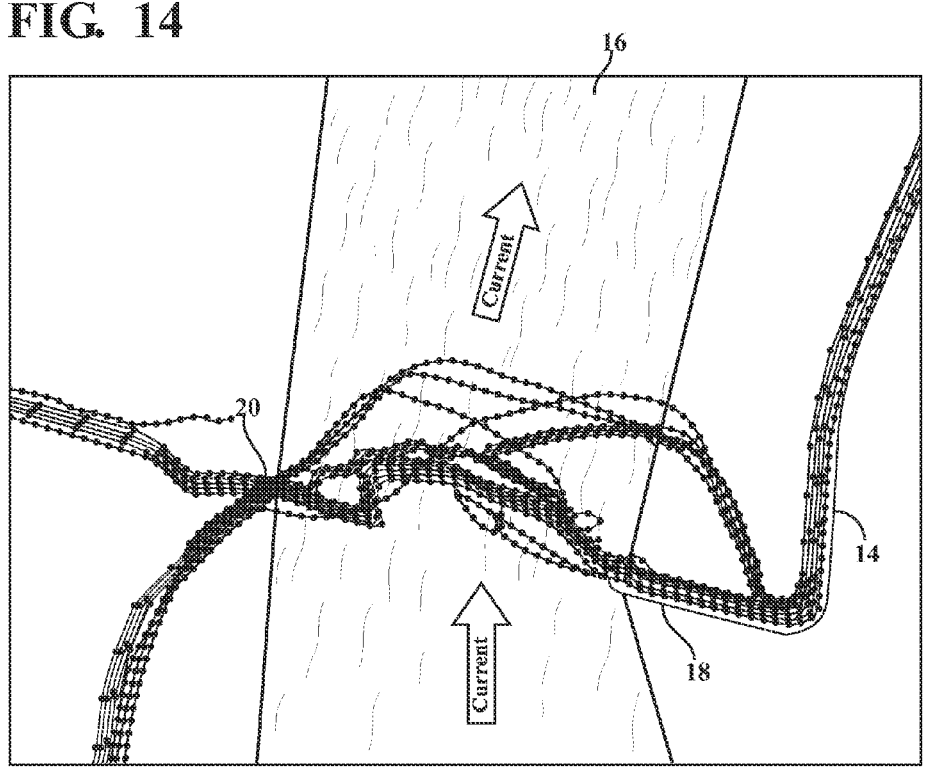
FIG. 14 shows a section of digital map containing an inland water barrier with superimposed probe trace data describing deviations of the speed lines from which river flow direction inferences can be made.

FIG. 14 shows a section of digital map through which an inland water barrier 16 travels in a South-to-North direction. Probe data superimposed over this section of digital map indicates average velocity crossing times below an established threshold, thereby leading to an inference of the existence of a ferry crossing 24. Furthermore, the existence of a ferry is corroborated in this case by deviation of the speed lines under the influence of river flow. Factors such as this may appear more often on large rivers with strong currents. Thus, not only does the deviation of the speed line corroborate the inference of a ferry crossing in this location, but the particular lateral deviation of some speed lines may also indicate, or confirm, a water current direction.

Figure 15:
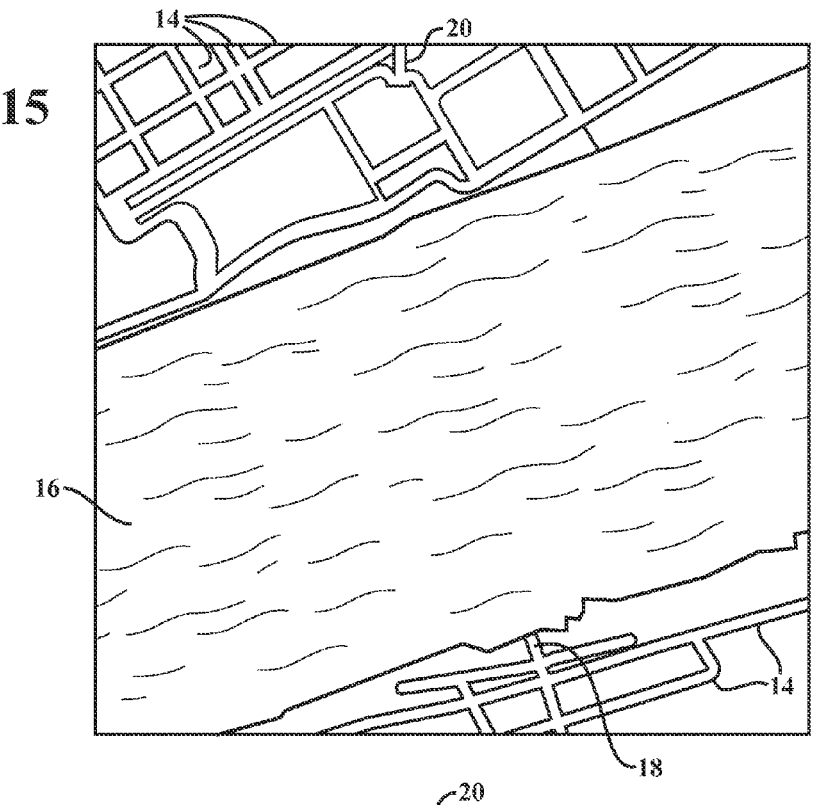
FIG. 15 is yet another example of a prior art digital map including an inland water barrier in the form of a river.
Figure 16:
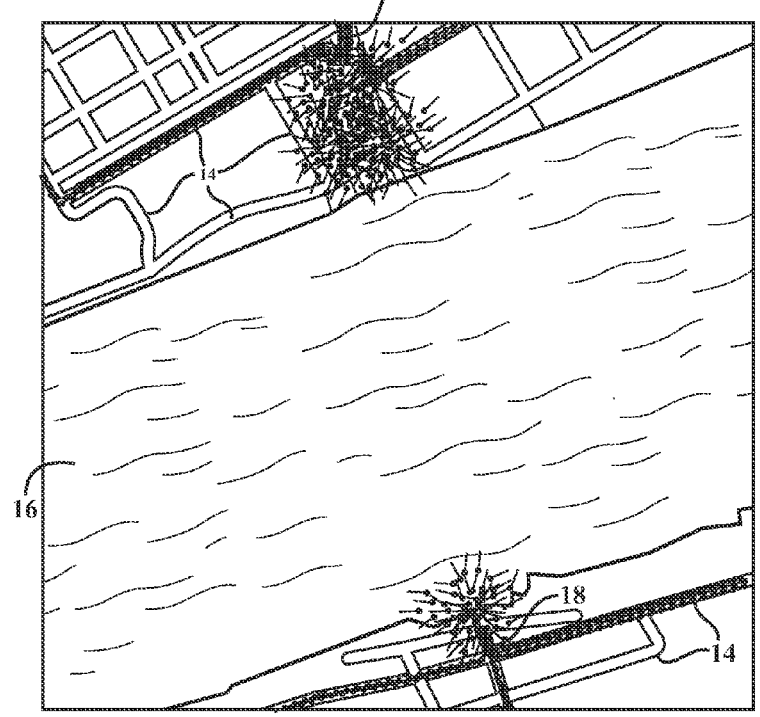
FIG. 16 is a view as in FIG. 15 superimposed with hypothetical velocity information from collected probe data from which can be inferred a tunnel crossing the inland water barrier together with tunnel entrance and exit points.
Figure 17:
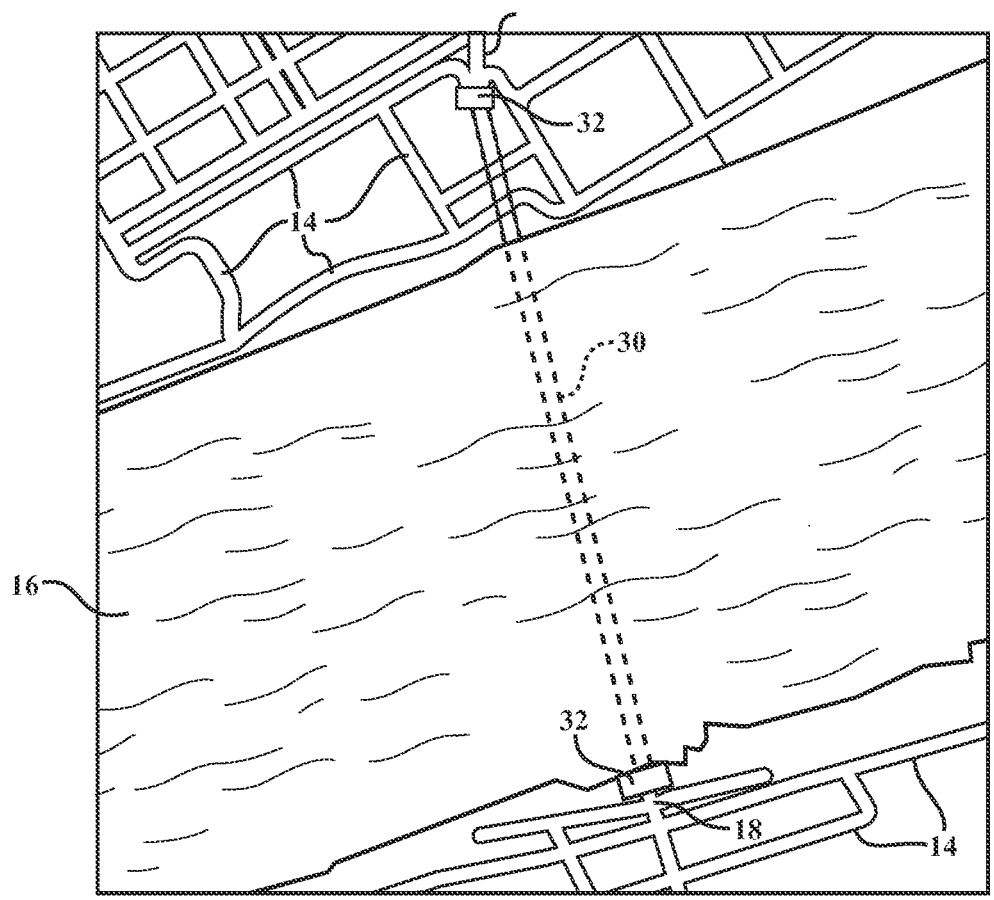
FIG. 17 is a view as in FIG. 15 showing an updated digital map designating a tunnel linking two road segments across the inland water barrier.

In addition to bridge and ferry modes of inland water barrier crossings, tunnels are also employed in some circumstances. FIGS. 15-17 represent a tunnel example, wherein the inland water barrier 16 comprises a river. In this example, the digital map contains no indication whatsoever for a crossing specification across this particular water barrier 16. However, as shown in FIG. 16, probe trace data with associated velocity information evidence a statistically relevant population of probes crossing the water barrier. However, the probe traces all contain noticeable gaps for which the data is generally nonexistent across the water barrier 16. In this particular instance, the total or substantial absence of any probe trace data across the inland barrier 16 indicates the presence of a tunnel, due to the loss of GPS signal inside the tunnel. This, coupled with relatively high or moderate speed probe traces which suddenly start/end on either side of a gap, in an otherwise continuous probe trace, indicate the possibility or likelihood of a tunnel.

FIG. 17 is a view of the digital map as in FIG. 15 but having been edited to indicate the presence of a tunnel 30 having entrances/exits 32 corresponding to the abrupt starting/stopping points in the otherwise continuous moderate-high speed probe trace data as shown in FIG. 16.

Figure 18:
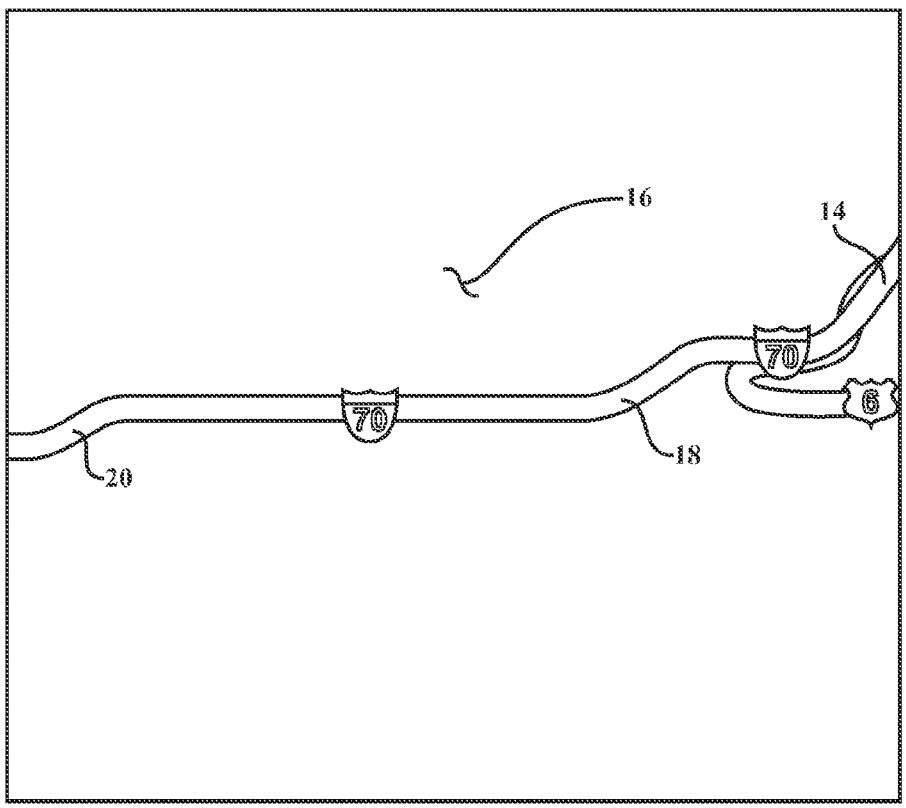
FIG. 18 is a still further example of a prior art digital map depicting a continuous road over land.
Figure 19:
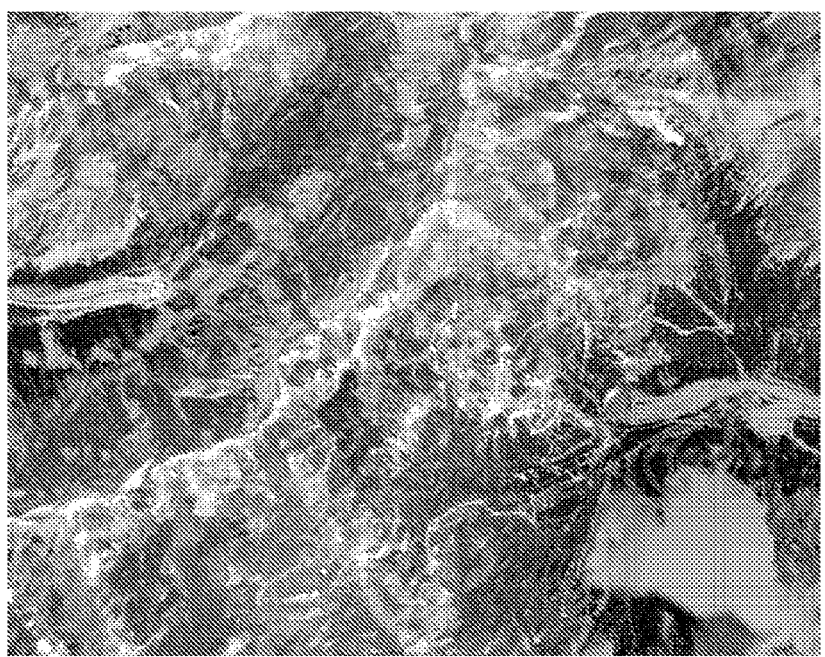
FIG. 19 is a satellite photograph providing Ground Truth for the section of land depicted in the digital map of FIG. 18, and wherein a tunnel is evident passing through a mountain ridge.
Figure 20:
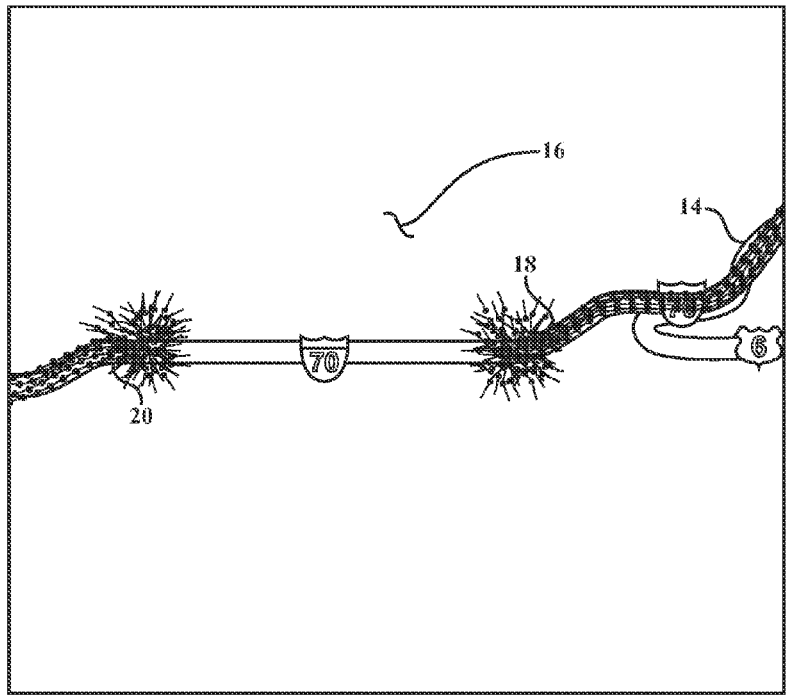
FIG. 20 is a view of the digital map in FIG. 18 overlaid with velocity information from collected probe data describing the nonexistence or interruption of probe trace data crossing the inland barrier from which a tunnel can be inferred.
Figure 21:
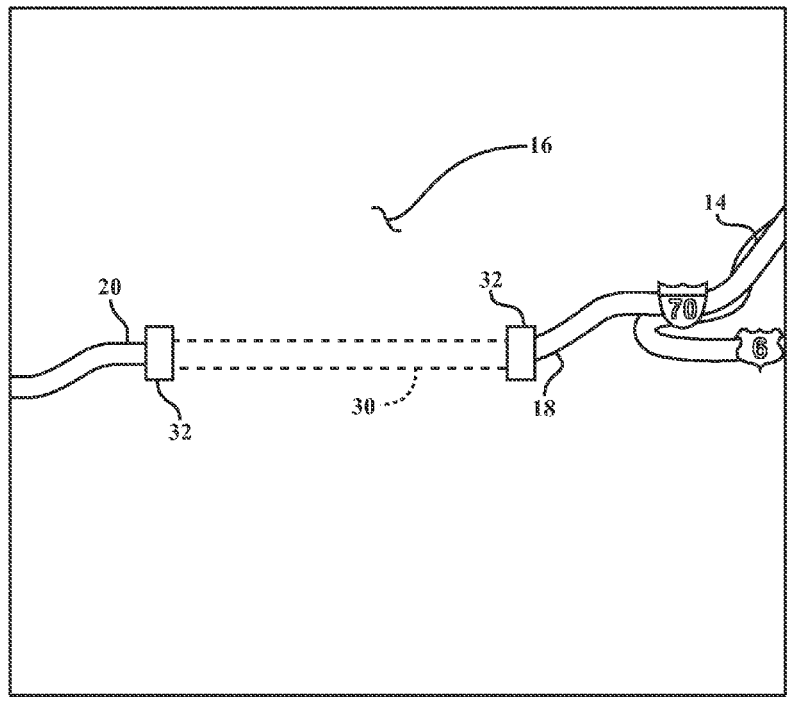
FIG. 21 is an updated view of the digital map of FIG. 18 showing a tunnel joining the road segments on either side of the inland barrier together with entrance and exit points.

The methods of this invention are not limited only to water type barriers. Bridges and tunnels are known to also exist in mountainous regions as well as other settings. FIG. 18 describes a section of digital map through which a motorway passes in a generally East-West direction. The digital map as shown contains no information whatsoever of any type of inland barrier in this region. FIG. 19 is a satellite photograph of the same region of land showing a mountain ridge crossing the motorway. A tunnel quite clearly passes through this mountain feature to allow passage of the motorway. FIG. 20 shows hypothetical probe data superimposed on the digital map. The probe traces are shown to have a relatively high, continuous speed which suddenly starts/ends on either side of an interim gap corresponding to the tunnel 30 passing through an inland barrier 16'. This gap in an otherwise generally continuous collection of probe traces indicates a tunnel 30 passage through the barrier 16'. The digital map may be updated as shown in FIG. 21 to indicate this tunnel 30, with entrances and exits 32 corresponding to the probe trace termination points on either side of the gap. Such tunnel information provided in a digital map may be particularly useful to travelers that are apprehensive about entering tunnels, or to common carriers who may be carrying explosive materials, wide loads, etc.

Principles of this invention can therefore be used by database editors and others responsible for maintaining the accuracy of digital maps to locate ferry crossings, tunnels and bridges, and to correct map errors which may show no crossing at all, a bridge 26 instead of a ferry 24, or a ferry 24 instead of a tunnel 30, etc. Techniques of this invention can be applied analytically while providing accurate and reliable results.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for validating an inland water barrier crossing specification in a digital map by observing local probe data, said method comprising:
   providing a digital map having at least two road segments separated from one another by an inland water barrier;
   reporting data from a plurality of probe traces traveling the at least two road segments in the vicinity of the inland water barrier, the reported data including velocity information or enabling the derivation of velocity information;
   identifying, by a processor, barrier crossing probe traces that traverse the inland water barrier crossing from one road segment to the other road segment;
   computing, by the processor, a velocity average for the barrier crossing probe traces;
   establishing a crossing speed threshold value;
   inferring, by the processor, a bridge linking the two road segments across the inland water barrier if the velocity average for the barrier crossing probe traces is greater than the crossing speed threshold value, and inferring a ferry linking the two road segments across the inland water barrier if the velocity average for the barrier crossing probe traces is less than the crossing speed threshold value; and
   altering, by the processor, the digital map, as needed, to designate a bridge or a ferry interconnecting the two road segments across the inland water barrier based on said inferring steps.

2. The method according to claim 1 further including the step of altering the digital map, as needed, to designate a vehicular bridge or a vehicular ferry interconnecting the two road segments across the inland water barrier based on said inferring steps.

3. The method according to claim 1 wherein said step of establishing a crossing speed threshold value includes selecting a threshold value less than 10 km/h.

4. The method according to claim 1 wherein said step of establishing a crossing speed threshold value includes selecting a threshold value less than 5 km/h.

5. The method according to claim 1 wherein said step of establishing a crossing speed threshold value includes selecting a threshold value less than 1 km/h.

6. The method according to claim 1 wherein said step of altering the digital map includes visually representing a vehicular bridge or a vehicular ferry across the inland water barrier.

7. The method according to claim 1 wherein said step of reporting data from a plurality of probes includes transporting each probe in a motor vehicle over the first and second road segments.

8. The method according to claim 1 wherein the reported data includes position data, further including the step of inferring a water current direction from the position data in combination with the average velocity information for the barrier crossing probe traces.

9. The method according to claim 1 wherein said step of computing the velocity average for the barrier crossing probe traces includes plotting the probe trace data on the digital map.

10. The method according to claim 1 wherein the reported data includes position data, further including the step of inferring ferry entrance and exit locations.

11. The method according to claim 1 further including the step of calculating an average time of crossing the inland water barrier for the barrier crossing probe traces.

12. The method according to claim 1 wherein the reported data includes time-based position data, further including the step of plotting the inland water barrier crossing frequency for different time slices.

13. The method according to claim 1 wherein said step of altering the digital map includes altering the display screen of a personal navigation device.

14. A method for determining bridge, tunnel and ferry crossing specifications with respect to an inland barrier in a digital map by observing local probe data, said method comprising the steps of:
   providing a digital map having at least two road segments separated from one another by an inland barrier, each road segment supporting traffic flow;
   reporting data from a plurality of probe traces traveling the at least two road segments in the vicinity of the inland barrier, the reported data including velocity information or enabling the derivation of velocity information;
   collecting probe measurements from a plurality of probe traces within a local area, each probe trace comprising a sequence of time-stamped probe positions from which, collectively, a velocity average may be observed;

isolating, by a processor, the probe traces that traverse the inland barrier crossing from one road segment to the other road segment, and grouping them as a sub-set of barrier crossing probe traces;

computing, by the processor, the velocity average for the grouped probe traces on each road segment and in transit across the inland water barrier;

establishing a crossing speed threshold value; and inferring, by the processor, a bridge linking the two road segments across the inland barrier if the velocity average for the grouped probe traces is greater than the crossing speed threshold value, and inferring a ferry linking the two road segments across the inland barrier if the velocity average for the grouped probe traces is less than the crossing speed threshold value, and inferring a tunnel linking the two road segments across the inland barrier if the velocity average for the grouped probe traces is generally nonexistent.

15. The method according to claim 14, wherein the reported data includes position data, further including the step of inferring tunnel entrance and exit locations.

\* \* \* \* \*